(12) United States Patent
Lesartre et al.

(10) Patent No.: US 6,643,766 B1
(45) Date of Patent: Nov. 4, 2003

(54) SPECULATIVE PRE-FETCHING ADDITIONAL LINE ON CACHE MISS IF NO REQUEST PENDING IN OUT-OF-ORDER PROCESSOR

(75) Inventors: Gregg B Lesartre, Ft Collins, CO (US); David Jerome Johnson, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/565,017

(22) Filed: May 4, 2000

(51) Int. Cl.$^7$ .................................................. G06F 9/38
(52) U.S. Cl. ...................... 712/207; 711/137; 711/213; 712/23
(58) Field of Search ................ 711/137, 213; 712/207, 23

(56) References Cited

U.S. PATENT DOCUMENTS 5,860,150 A * 1/1999 Chiarot et al. ............... 711/213
6,317,811 B1 * 11/2001 Deshpande et al. ......... 711/137
6,449,698 B1 * 9/2002 Deshpande et al. ......... 711/137

* cited by examiner

Primary Examiner—Kenneth S. Kim

(57) ABSTRACT

Speculative pre-fetching and pre-flushing of additional cache lines minimize cache miss latency and coherency check latency of an out of order instruction execution processor. A pre-fetch/pre-flush slot (DPRESLOT) is provided in a memory queue (MQUEUE) of the out-of-order execution processor. The DPRESLOT monitors the transactions between a system interface, e.g., the system bus, and an address reorder buffer slot (ARBSLOT) and/or between the system interface and a cache coherency check slot (CCCSLOT). When a cache miss is detected, the DPRESLOT causes one or more cache lines in addition to the data line, which caused the current cache miss, to be pre-fetched from the memory hierarchy into the cache memory (DCACHE) in anticipation that the additional data would be required in the near future. When a cache write back is detected as a result of a cache coherency check, the DPRESLOT causes one or more cache lines, in addition to the data line currently being written back, to be pre-flushed out to the memory hierarchy from the respective cache memory (DCACHE) of the processor that owns the line, in anticipation that the additional data would be required by the requesting processor in the near future. A logic included in the DPRESLOT prevents a cache miss request for the additional data when another request has already been made for the data.

17 Claims, 6 Drawing Sheets

(PRIOR ART)

SPECULATIVE PRE-FETCHING ADDITIONAL LINE ON CACHE MISS IF NO REQUEST PENDING IN OUT-OF-ORDER PROCESSOR

RELATED APPLICATION

The present application is related to an application for US Letter patent, entitled "Speculative Pre-flush of data in an Out-of-order Execution Processor System" by the present inventors, assigned to the assignee of the present application, having an, now issued U.S. Pat. No. 6,408,363.

TECHNICAL FIELD

The present invention generally relates to computer processor operations and architectures. More particularly the present invention relates to performance optimization by speculatively pre-fetching and pre-flushing data in a processor system in which instructions may be executed out of order.

BACKGROUND ART

A high performance processor, e.g., a super-scalar processor in which two or more scalar operations are performed in parallel, may be designed to execute instructions out of order, i.e., in an order that is different from what is defined by the program running on the processor. That is, in this high performance processor system, instructions are executed when they can be executed rather than when they appear in the sequence defined by the program. Typically, after the out of order execution of instructions, the results are ultimately reordered to correspond with the proper instruction order, prior to passing the results back to the program running on the processor.

Examples of processor architectures that execute instruction out of order are described in U.S. Pat. No. 5,758,178 (issued May 26, 1998, and entitled "Miss Tracking System and Method"), U.S. Pat. No. 5,761,713 (issued Jun. 2, 1998, and entitled "Address Aggregation System and Method for Increasing Throughput to a Multi-Banked Data Cache From a Processor by Concurrently Forwarding an Address to Each Bank"), U.S. Pat. No. 5,838,942 (issued Nov. 17, 1998, and entitled "Panic Trap System and Method"), U.S. Pat. No. 5,809,275 (issued Sep. 15, 1998, and entitled "Store-to Load Hazard Resolution System and Method for a Processor that Executes Instructions Out of Order"), U.S. Pat. No. 5,799,167 (issued Aug. 25, 1998, and entitled "Instruction Nullification System and Method for a Processor that Executes Instructions Out of Order"), all to Gregg Lesartre who is one of the present inventors, assigned to the present assignee, and all of which are expressly incorporated herein by reference in their entireties.

As described in more detail in, e.g., U.S. Pat. No. 5,758,178 ('178), an out of order execution processor system may include one or more processors, each having a memory queue (MQUEUE) for receiving and executing instructions that are directed to memory accesses to the cache memory (DCACHE) or the memory hierarchy. The MQUEUE includes a plurality of instruction processing mechanisms for receiving and executing respective memory instructions out of order. Each instruction processing mechanism includes an instruction register for storing an instruction and an address reorder buffer slot (ARBSLOT) for storing the data address of the instruction execution results. Significantly, dependent-on-miss (DM) indicator logic in each ARBSLOT prevents a request from its respective ARBSLOT to the memory hierarchy for miss data that is absent from the DCACHE when another ARBSLOT has already requested from the memory hierarchy the miss data.

In particular, for example, FIG. 1 shows a block diagram of the relevant portions of the computer system for illustrating the operation of the instruction processing mechanism 39b portion of the MQUEUE. The MQUEUE includes one or more ARBSLOTs 48 (only one of which is shown). When an ARBSLOT 48 requests a cache line from the DCACHE 24, the ARBSLOT 48 asserts signal ACCESS_REQ 115 accompanied with an address ACCESS_ADDR 114. In the event that there is a potential hit in the DCACHE 24, the status indicator 82 (or status indicators if the cache is associative) will reflect a valid cache line or lines. Further, the tag compare mechanism 108 reads the tag DCACHE_TAG(s) 81 and compares it to the tag ACCESS_TAG 116 associated with the access address ACCESS_ADDR 114. When there is a match, the tag compare mechanism 108 concludes that there is a hit and deasserts the signal ~HIT 118 to indicate a hit, which causes the ARBSLOT 48 to mark itself done. The result of the operation is held in a rename register (not shown) until the instruction retires, when it is moved to an architectural register (not shown).

When the cache access results in a cache miss, e.g., based upon a status indicator 82 indicating an invalid cache line(s), or alternatively, when the tag DCACHE_TAG(s) 81 does not match the tag ACCESS_TAG 116, then the tag compare mechanism 108 asserts the ~HIT signal 118 to indicate a miss to the ARBSLOT 48. Assuming that this is the first ARBSLOT 48 to attempt to access this miss data line, the DM indicator logic 135 causes the miss request signal MISS_REQUEST 111 to be issued to the miss arbitrator 107. The miss arbitrator 107 arbitrates by prioritizing the various miss requests that can be generated by the various ARBSLOTS 48. Eventually, the miss arbitrator 107 issues a signal MISS_GRANTED 112 to grant the miss request. This signal is sent to the ARBSLOT 48, which in turn asserts the miss control signal MISS_CAV signal 101 to the system interface control 102. The system interface control 102 in turn makes a memory request to the memory hierarchy (not shown) for the data line based upon the address MISS/COPY_IN ADDR 104 that is forwarded from the ARBSLOT 48 to the system interface control 102.

Once the data line is transferred from the memory hierarchy to the system interface control 102, the system interface control 102 passes the data line to the DCACHE 24, as indicated by reference arrow 105, asserts the control signal COPY_IN to the DCACHE 24, and issues the status bits to the DCACHE 24. Simultaneously, the system interface control 102 asserts the control signal COPY_IN 103 to the ARBSLOTs 48 and places the associated address on MISS/COPY_IN ADDR 104 to the ARBSLOTs 48.

If another ARBSLOT 148 attempts to access the DCACHE 24 for a miss data line that is currently being requested from memory hierarchy, then the particular ARBSLOT 48 will be advised by the status indicator 82, as the status indicator 82 will indicate a miss pending status, or that the cache line is being requested by another ARBSLOT 48. Thus, a redundant memory request for a data line that has already been requested is avoided. A more detailed description of the memory queue (MQUEUE) and the DM indicator 135 may be found in the above listed US patents, e.g., the '178 patent.

While modem day high performance processors, e.g., a super-scalar processor described above, have improved greatly in the instruction execution time, slow memory access time is still a significant impediment to a processor running at its full speed. If requests for data can be fulfilled from the cache memory, delays associated with an access to the slower memory hierarchy—usually referred to as a cache miss latency—can be avoided. Thus, reducing the number of cache misses is a goal in high performance processor designs.

Moreover, in a multi-processor systems, whenever a processor requests a data line, a coherency check is required to determine if respective caches of the other processors contain the requested data line, and/or whether a writing back (or flushing) of the data line to the memory hierarchy is required, e.g., when the data line was modified by the particular processor that owns the data line. The coherency check adds delays to memory accesses—referred to herein as coherency check latency—.

Speculative pre-fetching and pre-flushing are based on a well known locality theory, called the spatial locality theory, which observes that when information is accessed by the processor, information whose addresses are nearby the accessed information tend to be accessed as well. This is particularly true when the load or store operation that caused the cache miss is a part of an instruction code sequence, which is accessing a record length longer than a cache line, i.e., when the instruction code sequence references data that spans over a multiple data lines. In a system utilizing pre-fetching and/or pre-flushing, rather than fetching (and/or flushing) only currently accessed data into (or from) the cache memory, a block of data (or one or more cache lines) in the vicinity, including the currently accessed data, may be brought into (and/or flushed from) the cache memory. This speculative pre-fetching and pre-flushing of extra data lines into (or from) the data cache before it is required by later memory reference instructions may hide at least some of the cache-miss latency and the coherency check latency, and thus improve the overall performance of the processor system.

Unfortunately, however, heretofore, no known solutions for implementing pre-fetching and/or pre-flushing data lines in processors that perform out of order execution of instructions exists. In a system employing a speculative pre-fetching and/or pre-flushing described above, each additional memory request resulting from an out of order execution of instructions involves a memory transaction that requires transfer of a number of data lines (rather than a single data line without the pre-fetching or pre-flushing of extra data line(s)), and may result in an even greater increased traffic across the system bus, may exacerbate the excessive utilization of the system interface bandwidth, and thus may compromise system performance.

Thus, what is needed is an efficient system for and method of pre-fetching one or more data lines from a memory hierarchy to a cache memory without compromising the system performance of an out of order processing system.

What is also needed is an efficient system and method for one or more pre-fetching data lines from memory hierarchy to a cache memory while minimizing redundant multiple memory requests in the event of a cache miss in an out of order processing system.

What is also needed is an efficient system for and method of pre-flushing one or more data lines from a cache memory in a multiple out-of-order instruction execution processors system without adding to the system complexity, and thereby minimizing coherency check latency of the system.

SUMMARY OF INVENTION

In accordance with the principles of the present invention, an apparatus for minimizing cache miss latency in an out of order instruction execution system comprises a plurality of address reorder buffer slots each having stored therein an address corresponding to a data line of a plurality data lines, each of the plurality of data lines being stored in at least one of a cache memory and a memory hierarchy, at least one pre-fetch slot configured to, upon detection of a cache miss of a first data line resulting from an access request from at least one of the plurality of address reorder buffer slots, determine at least one additional data line to be pre-fetched into the cache memory from the memory hierarchy, and a logic associated with the at least one pre-fetch slot, the logic configured to provide an indication whether the at least one additional data line is already being requested from the memory hierarchy by any of the plurality of address reorder buffer slots.

In addition, in accordance with another aspect of the principles of the present invention, a method of minimizing cache miss latency in an out of order instruction execution system comprises detecting an occurrence of a cache miss of a first data line, calculating addresses of at least one additional data line to be pre-fetched into a cache memory from a memory hierarchy, and determining whether said at least one additional data line is already being requested from said memory hierarchy, or already resident in the cache memory.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplar embodiment, particularly, with references to an example in which a specific circuit design is implemented. However, one of ordinary skill in the art would readily recognize that the same principles are equally applicable to, and can be implemented in, other circuit designs, and that any such variation would be within such modifications that do not depart from the true spirit and scope of the present invention.

In accordance with the principles of the present invention, a pre-fetch/pre-flush slot (DPRESLOT) is provided in a memory queue (MQUEUE) of the out-of-order execution processor. The DPRESLOT monitors the transactions between a system interface, e.g., the system bus, and an address reorder buffer slot (ARBSLOT) and/or between the system interface and a cache coherency check slot (CCCSLOT). When a cache miss is detected, the DPRESLOT causes one or more cache lines in addition to the data line, which caused the current cache miss, to be pre-fetched from the memory hierarchy into the cache memory (DCACHE) in anticipation that the additional data would be required in the near future. When a cache write back is detected as a result of a cache coherency check, the DPRESLOT causes one or more cache lines, in addition to the data line currently being written back, to be pre-flushed out to the memory hierarchy from the respective cache memory (DCACHE) of the processor that owns the line, in anticipation that the additional data would be required by the requesting processor in the near future. A logic included in the DPRESLOT prevents a cache miss request for the additional data when another request has already been made for the data. Speculative pre-fetching and pre-flushing of the additional cache lines minimize cache miss latency and coherency check latency of an out of order instruction execution processor.

Figure 1:
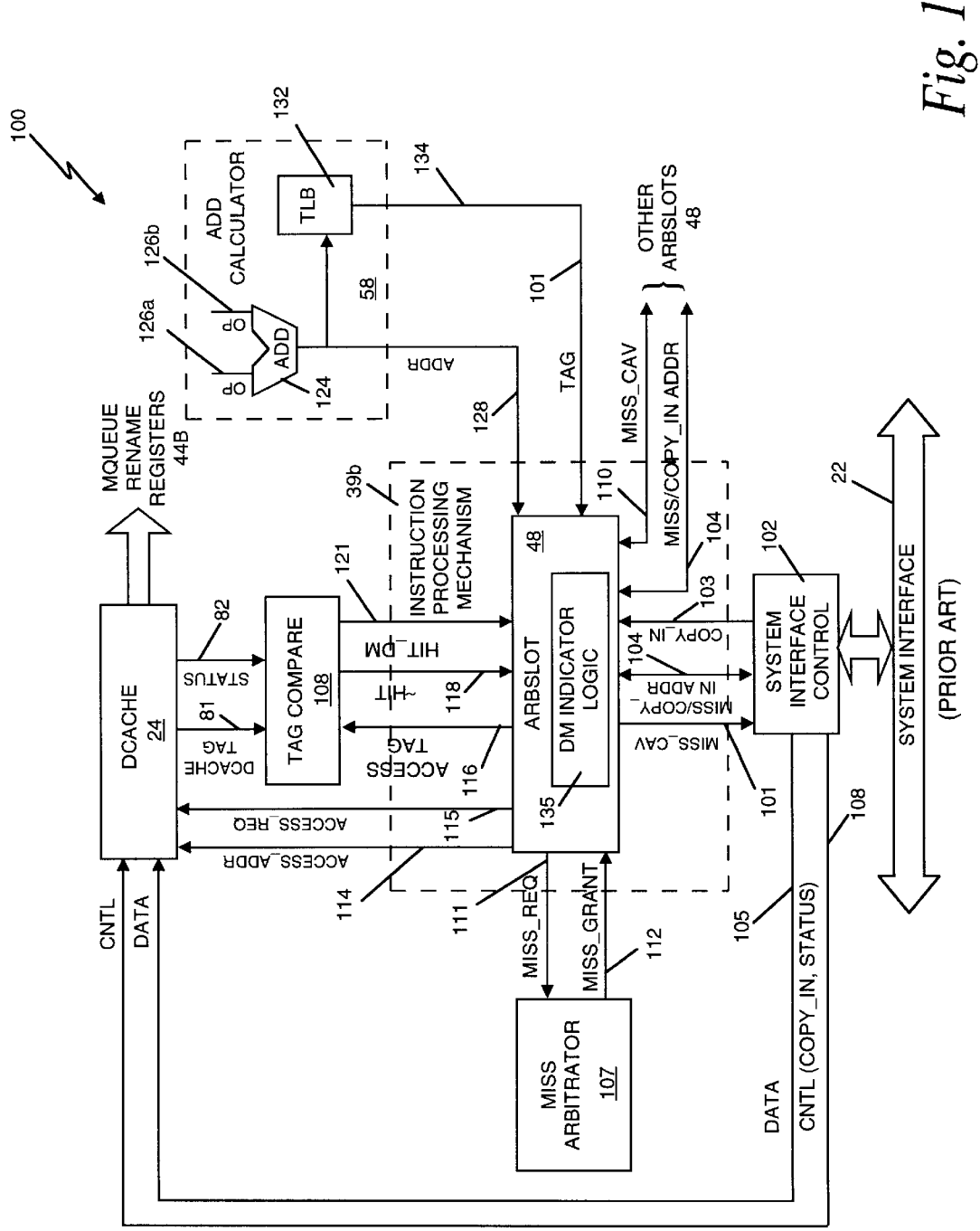
FIG. 1 is a block diagram showing the relevant portions of a legacy computer system having an out-of-order instruction execution processor.

In particular, according to a preferred embodiment of the present invention, one or more DPRESLOT(s) is added to the instruction processing mechanism 39b (FIG. 1). In the alternative, one or more of the ARBSLOT shown in FIG. 1 may be modified to perform the functions of the DPRESLOT, which will now be described in more detail.

Figure 2:
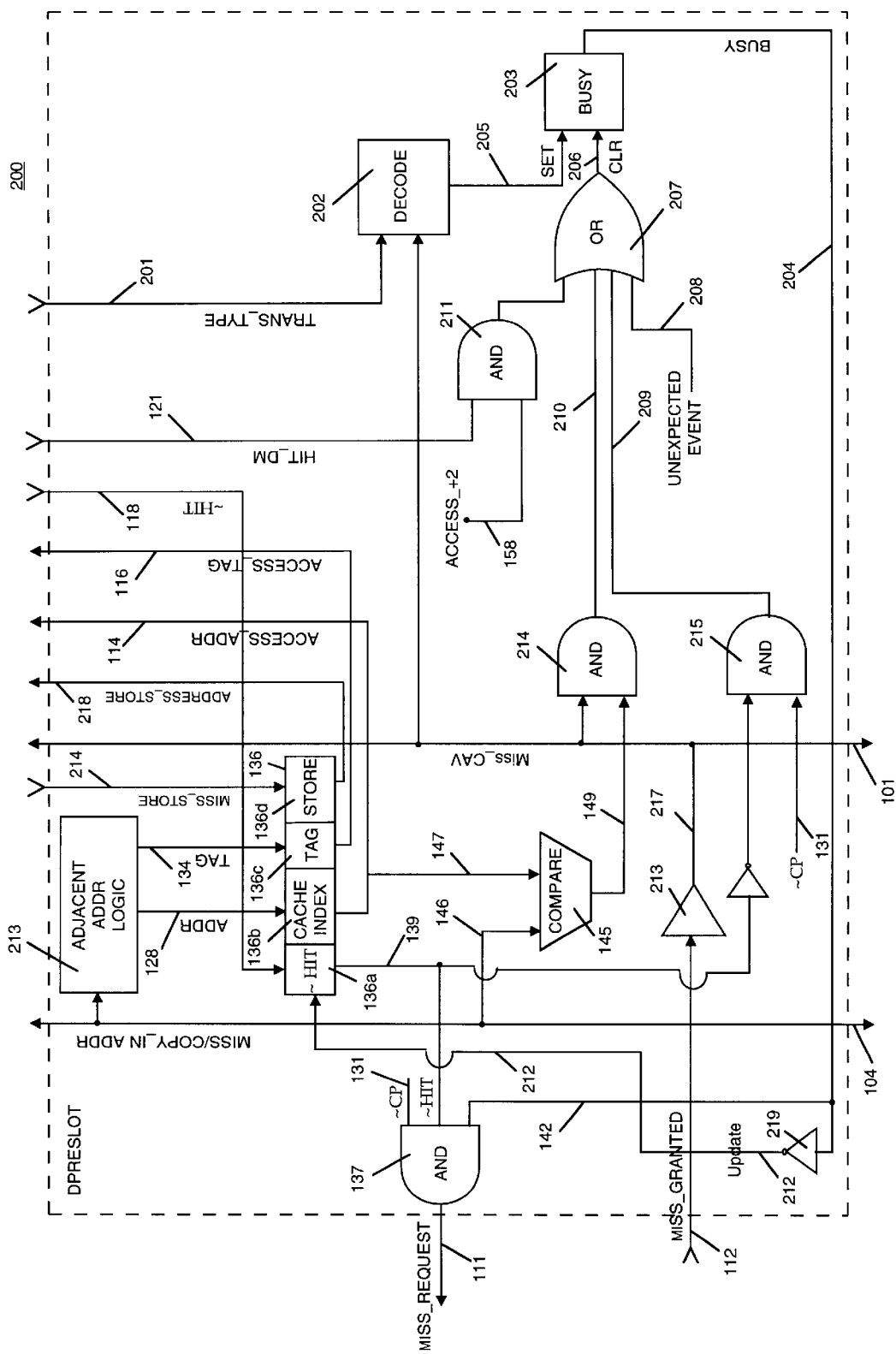
FIG. 2 is a block diagram of an exemplary embodiment of the pre-fetch/pre-flush slot (DPRESLOT) in accordance with the principles of the present invention.

FIG. 2 shows a block diagram of an exemplary embodiment of the pre-fetch/pre-flush slot (DPRESLOT) 200 in accordance with the principles of the present invention, which includes a register 136 for storing a not hit (~HIT) indicator 136a set by the signal ~HIT 118 from the tag compare mechanism 108 (FIG. 1), a cache index 136b and a real address tag (TAG) 136c, which are received as an address ADDR 128 and a TAG 134, respectively, from the adjacent address logic 213, and, optionally in a preferred embodiment of the present invention, amiss type store 136d for holding a store flag (STORE) received from a MISS_STORE input 214. The single bit flag STORE indicates whether the memory access instruction being processed performs a read or a write operation, and is derived from the instruction currently being processed in the instruction processing mechanism 39b (FIG. 1). The flag STORE is used by the DCACHE 24 to maintain the cache operation with respect to the pre-fetched data line(s) consistent with the memory access instruction being performed.

The adjacent address logic 213 receives the address present on the MISS/COPY_IN ADDR 104, which is part of the transactional interface between the instruction processing mechanism 39b (FIG. 1) and the system interface control 102 (FIG. 1). The adjacent address logic 213 produces address that are adjacently located to the address received from the MISS/COPY_IN ADDR 104 by, e.g., inverting one or more lower significant bits of the received address or by a use of a counter to generate a number of addresses. In this exemplary embodiment, the least significant bit (LSB) of the received address is inverted to produce a single address having a location immediately next to, i.e., immediately preceding or following, the received address.

The adjacent address(es) thus produced is output on the ADDR 128 for storage in the CACHE INDEX 136b of the register 136. The adjacent address logic 213 also provides the TAG 134, which is a real page number (RPN) associated with the adjacent address in the preferred embodiment, for storage in the TAG 136c of the register 136. The register 136 receives an update signal 212. While the update signal 212 is active, the register 136 updates its content, i.e., contents of each of the fields, the ~HIT 136a, the CACHE INDEX 136b, the TAG 136c and the STORE 136d.

The update signal 212 is output from the inverter 219, which receives as its input a BUSY signal 204 from the busy latch 203. The busy latch 203 may comprise, e.g., a set-and-reset (S-R) flip-flop, and has two inputs, SET 205 and CLR 206, which sets and resets the BUSY signal 204, respectively. When the BUS Y signal 204 is set, i.e., active, the update signal 212 becomes inactive, and thus the updating of the register 136 is stopped. The SET input 205 receives a decoded output from the decoder 202, which receives input signals, MISS_CAV 101 and TRANS_TYPE 201. The TRANS_TYPE 201 may be one of, but not limited to, a "load miss" resulting from a read instruction, a "store" miss resulting from a write instruction, and a coherency check response. TRANS_TYPE 201 is derived from the instruction currently being processed by the instruction processing mechanism 39b (FIG. 1) and/or from signals received from the system interface control 102 (FIG. 1).

The decoder 202 outputs an active SET 205 signal when the MISS_CAV 101 indicates a valid address being present on the MISS/COPY_IN ADDR 104 and when the TRANS_TYPE 201 indicates that the transaction being processed in the transactional interface between the instruction processing mechanism 39b (FIG. 1) and the system interface control 102 (FIG. 1) is a memory access request resulting from a cache miss for any of the ARBSLOTs 48, or resulting from a cache coherency check, which will be described in more detail later.

The register 136 continuously updates its content as long as the BUSY signal 204 remains inactive (i.e., when the update signal 212 is active). When BUSY signal 204 becomes active, the register 136 halts updating its content, and the DPRESLOT 200 issues an ACCESS_REQ 115 (shown in FIG. 1) presenting the current contents of the CACHE INDEX 136b, the TAG 136c and the STORE 136d on the ACCESS_ADDR 114, the ACCESS_TAG 116 and the ACCESS_STORE 218, respectively, to the DCACHE 24.

In the event that there is a potential hit in the DCACHE 24, the status indicator 82 will reflect a valid cache line(s) as described in more detail in the '178 patent. Further, the tag compare mechanism 108 reads the tag DCACHE_TAG(s) 81 and compares it to the tag ACCESS_TAG 116 associated with the access address ACCESS_ADDR 114. When there is a match, the tag compare mechanism 108 concludes that there is a hit and deasserts the signal ~HIT 118 to indicate a hit, which causes the CLR input 206 of the busy latch 203 to be asserted, causing the BUSY signal 204 to be deasserted.

When the cache access misses based upon a status indicator 82, or alternatively, when the tag DCACHE_TAG 81 does not match the tag ACCESS_TAG 116, then the tag compare mechanism 108 asserts the HIT signal 118 to indicate a miss. A compare mechanism 145 receives a cache index from the address MISS/COPY_IN ADDR 104, as indicated by reference arrow 146, and compares it to the CACHE INDEX 136b from the register 136, as indicated by reference arrow 147. The results of the compare mechanism 145 are passed to an AND gate 214, as indicated by reference arrow 149. Provided that the miss control signal MISS_CAV 101 is asserted, the compare signal 149 can cause the busy latch 203 to be reset, causing the BUSY signal 204 to be deasserted. In this exemplary embodiment, the compare signal 149 enables the updating of the register 136 to be resumed after the MISS_GRANTED signal 112 is received by the DPRESLOT 200.

The busy latch 203 may also be reset when there is already a pending request for the cache line. If any of the ARBSLOTs 148 has already requested the same cache line from memory hierarchy (not shown), then the DPRESLOT 200 will be advised by the status indicator 82 (FIG. 1), as the status indicator 82 will indicate a miss pending status as described in more detail in the '178 patent. In this case, the tag compare mechanism 108 asserts the signal HIT_DM 121 (as shown in FIG. 1), which is input, along with a signal ACCESS_+_2, denoted by reference numeral 158 representing two cycles after the signal ACCESS_REQ 115 (FIG. 3), to the AND logic gate 211, which causes the BUSY signal 204 to be deasserted.

Yet another occasion in which the busy latch 203 may be cleared is when a signal indicative of an occurrence of an unexpected catastrophic event is received from the input 208 of the OR logic gate 207. An unexpected catastrophic event may be, e.g., a CPU trap.

Since the BUSY signal 204 is input to the AND logic gate 137, when it is inactive, i.e., in a deasserted state, the DPRESLOT 200 is precluded from making a MISS_REQUEST 111. The deasserted BUSY signal 204 also causes the register 136 to resume update of its contents.

If, on the other hand, the ACCESS_REQ 115 of this adjacent cache line caused amiss, i.e., ~HIT signal 139 and the BUSY signal 204 are asserted, then the AND logic gate 137 will issue the miss request signal MISS_REQUEST 111 to the miss arbitrator 107 (FIG. 1). The miss arbitrator 107 arbitrates by prioritizing the various miss requests that can be generated by the various ARBSLOTS 48 and/or the DPRESLOT 200. Eventually, the miss arbitrator 107 issues a signal MISS_GRANTED 112 to grant the miss request. This signal is sent to the driver 213 in the DPRESLOT 200, which in turn asserts the miss control signal MISS_CAV signal 101 to the system interface control 102. The system interface control 102 in turn makes a memory request to the memory hierarchy (not shown) for the data line based upon the address MISS/COPY_IN ADDR 104.

Figure 2A:
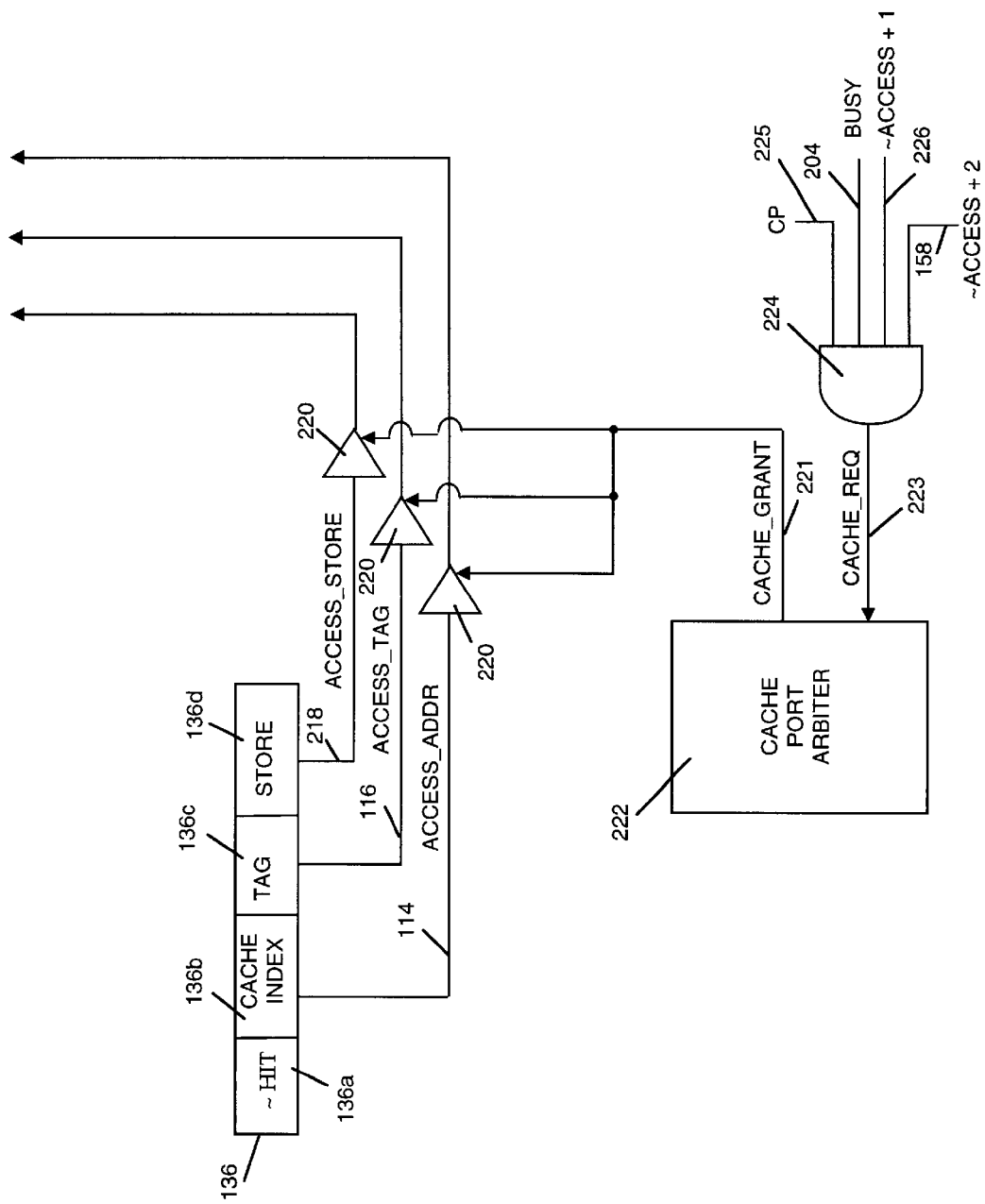
FIG. 2A is a block diagram of an exemplary embodiment of the cache port arbitration logic in accordance with a preferred embodiment of the present invention.

FIG. 2A shows an exemplary block diagram of the relevant portions of the cache port arbitration logic in accordance with a preferred embodiment of the present invention, in which three drivers 220 are added, each of which are enabled, i.e., allowed to output the signal presented in the respective inputs, when the CACHE_GRANT signal 221 is asserted by the cache port arbiter 222, which may be a part of the DCACHE 24. The CACHE_GRANT signal 221 is asserted upon a receipt, and an arbitration, of the the CACHE_REQ signal 223, which is received from the AND logic gate 224. The AND logic gate 224 in turn receives, as its inputs, the clock pulse 225, the BUSY signal 204, the ~ACCESS+1 (i.e., the complement of one clock cycles after the ACCESS_REQ 115) 226 and ~ACCESS+2 (i.e., the complement of two clock cycles after the ACCESS_REQ 115) 158.

Figure 3:
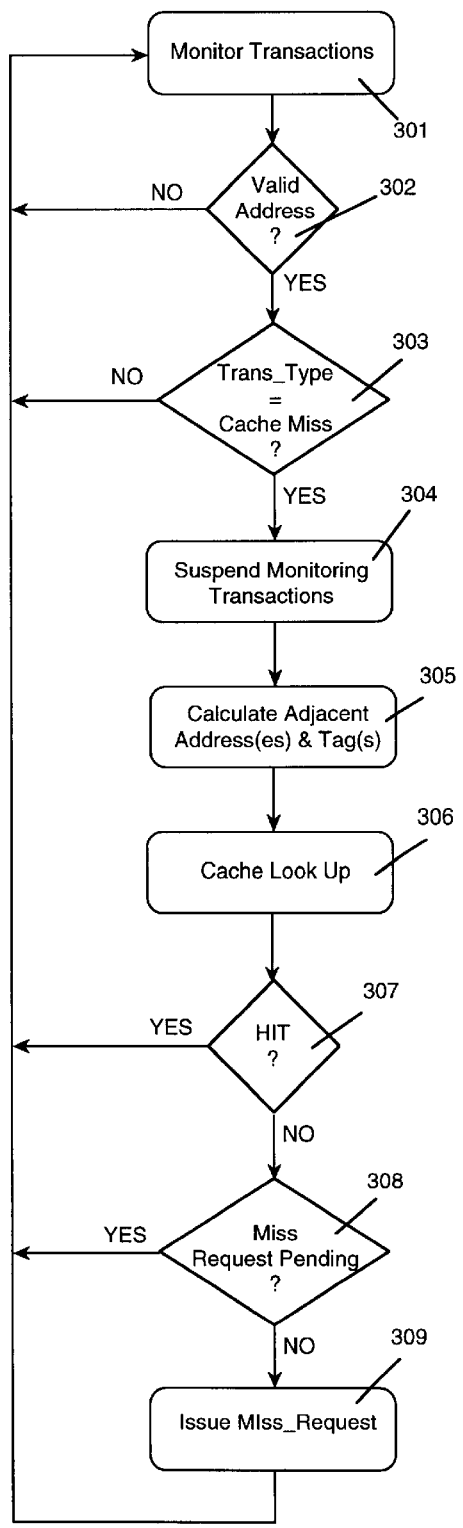
FIG. 3 is a flow diagram of an exemplary embodiment of the pre-fetching process in accordance with the principles of the present invention.

The process of the inventive pre-fetch operation will now be described with reference to an exemplary flow diagram shown in FIGS. 3. In step 301, the transactional interface between the instruction processing mechanism 39b and the system interface control 102 (which will be referred to as simply the "transactional interface" hereafter) is continuously monitored for a presence of any transaction, which may be accomplished by, for example, by monitoring for an assertion of the MISS_CAV 101 in the exemplary DPRESLOT 200 shown in FIG. 2.

Once a transaction is detected, a determination is made, in step 302, whether there is a valid address present in the transactional interface. In the example shown in FIG. 2, the presence of a valid address may be presumed, e.g., when the MISS_CAV signal 101 is asserted. When it is determined that a valid address is not present on the transactional interface, then the process returns to step 301, i.e., the monitoring of the transactional interface continues.

On the other hand, if a valid address is detected, the process proceeds to step 303, during which a determination is made whether the transaction is a memory access request resulting from a cache miss. In the example of FIG. 2, this determination can be made based on the TRANS_TYPE 201. When it is determined that the transaction is not a cache miss, then the process returns to step 301, i.e., the monitoring of the transactional interface continues.

However, if the transaction is a memory access request resulting from a cache miss, then, in step 304, the monitoring of the transactional interface is halted. In the DPRESLOT 200, for example, the updating of the register 136 is halted by setting the busy latch 203. Then, in step 305, one or more address(es) of data lines to be pre-fetched are calculated. For example, in the DPRESLOT 200, the adjacent address logic 213 calculates the to-be-pre-fetched addresses by inverting one or more bits (e.g., the least significant bit (LSB)) of the address of the data line, the attempted access of which has caused the cache miss, present on the MISS/COPY_IN ADDR 104.

In step 306, a cache look-up operation is performed for the addresses calculated during the above step 305. For example, in the example of FIG. 2, the DPRESLOT 200 issues an ACCESS_REQ 115 presenting the current contents of the CACHE INDEX 136b, the TAG 136c and the STORE 136d on the ACCESS_ADDR 114, the ACCESS_TAG 116 and the ACCESS_STORE 218, respectively, to the DCACHE 24.

In step 307, the result of the cache look-up operation is examined to determine whether the to-be-pre-fetched data lines are already present in the cache memory, i.e., a cache hit occurs. For example, in the FIG. 2 example, the DPRESLOT 200 determines that a cache hit has occurred by observing the ~HIT 118 being deasserted by the tag compare mechanism 108. If a cache hit has occurred, the process returns to step 301, and the monitoring of the transactional interface is resumed.

If, however, in step 307, a cache miss is detected, the process proceeds to step 308, in which a determination whether a request for the to-be-pre-fetched data line(s) is already made, e.g., by a ARBSLOT 48 in the example shown in FIG. 2. In the example of FIG. 2, a pending request for the data line may be detected from the HIT_DM 121. If it is determined that a request for the data line is already pending, then the process returns to step 301, and the monitoring of the transactional interface is resumed.

Finally, in step 309, if no prior requests for the data line is pending, a request for the to-be-pre-fetched data line is issued, e.g., by issuing the MISS_REQUEST 111 in the example of FIG. 2, which eventually leads to MISS_CAV 101 being asserted, and causes a memory hierarchy access for the data line(s). In a preferred embodiment, once the request for the to-be-pre-fetched data line(s) is issued (MISS_CAV 101 fires), the process immediately returns to step 301, and the entire process is continuously repeated. In FIG. 2, for example, the system interface control 102 advantageously handles the actual access of the memory hierarchy, allowing the DPRESLOT 200 to continue the above described process. When the address of the to-be-pre-fetched data line is placed on the MISS/COPY_IN ADDR 104 as a part of the request to the system control interface 102, the compare 145 receives identical cache index on both of its inputs 146 and 147, and thus the BUSY signal 204 is deasserted, causing the register 136 to resume updating of its contents.

If a miss request is initiated by an instruction in ARB-SLOT 48, that matches the address on the compare input 147 before DPRESLOT 200 receives the MISS_GRANTED signal 112, the BUSY signal 204 will still be deasserted, and updating the register 136 will still resume.

The inventive cache pre-flushing system and method in accordance with the principles of the present invention will now be described with references to exemplary embodiments shown in FIGS. 4 and 5.

According to a preferred embodiment of the present invention, one or more cache coherency check slot (CCCSLOT) is added to the instruction processing mechanism 39b (FIG. 1). In the alternative, one or more of the ARBSLOTs shown in FIG. 1 may be modified to assume the functions of the CCCSLOT, which will now be described in more detail.

Figure 4:
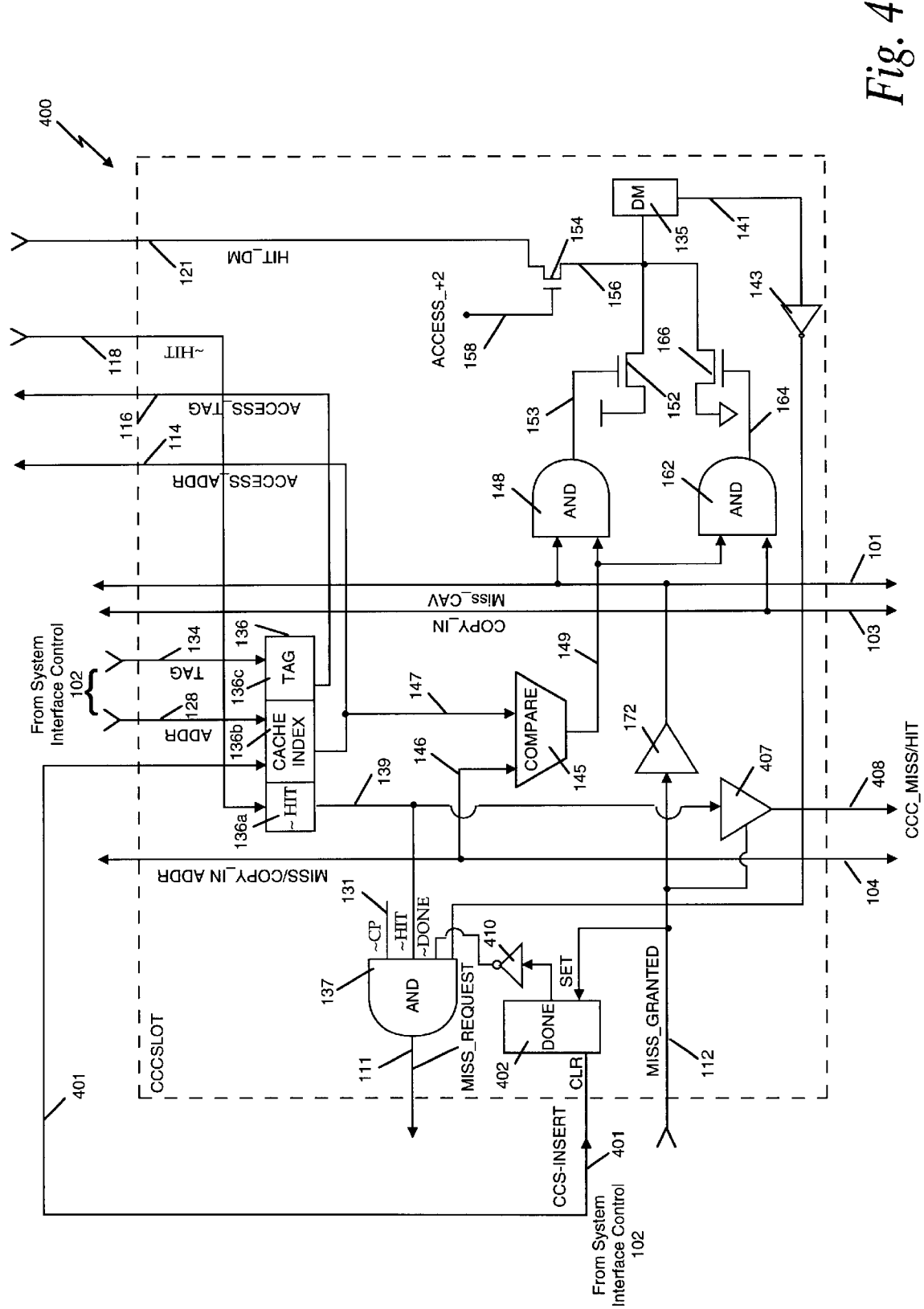
FIG. 4 is a block diagram of an exemplary embodiment of the cache coherency check slot (CCCSLOT) in accordance with the principles of the present invention.

In particular, FIG. 4 shows a block diagram of an exemplary embodiment of the cache coherency check slot (CCCSLOT), which may appear and functions in much similar way as an ARBSLOT 48, as described in the '178 patent, with the key differences being, inter alia, the addition of the done latch 402 and the driver 407, and that the address 128 and the tag 134 are received, rather than from the address calculator 58, from the system interface control 102.

When any of the multiple processors in a multiple processors computing system requests one or more data line(s) from the memory hierarchy, the memory request and the address(s) of the one or more data lines(s) appear on the system interface 22 (FIG. 1). Each processor's system interface 102, upon detecting the memory request, issues a CCC_INSERT signal 401 to its instruction processing mechanism 39B.

To this end, in the preferred embodiment of the present invention, the respective CCCSLOT 400 of each of the processors receives the ADDR 128, the TAG 134 and the CCC_INSERT signal 401 from the system interface control 102, the ADDR 128 and the TAG 134 being associated with the data line being requested by another processor in the system. The CCC_INSERT signal 401 serves as a clock signal to the register 136 of the CCCSLOT 400, thus allowing the register 136 to update its CACHE INDEX 136b and the TAG 136c with the ADDR 128 and the TAG 134, respectively. The CCC_INSERT signal 401 is also input to the clear (CLR) input of the done latch 402, which may be, e.g., a set-and-reset (S-R) flip-flop. When the CLR input is received, the output of the done latch 402 becomes inactive. The inverter 410 inverts the output signal of the done latch 401, thus presenting an active signal ~DONE to the input of the AND logic gate 137 as shown.

Upon receipt of the CCC_INSERT signal 401, the CCCSLOT 400 issues a ACCESS_REQ signal 115 to the DCACHE 24, and places the CACHE INDEX 136b and the TAG 134 on the ACCESS_ADDR 114 and the ACCESS_TAG 116, respectively. In response, the DCACHE 24 issues the DCACHE TAG(s) 81 and the STATUS(s) 82 as shown in FIG. 1. In much similar manner as previously described in the '178 patent with regard to the ARBSLOT 48, a MISS_REQUEST 111 is generated when the data line corresponding to the ADDR 128 and the TAG 134 is absent from DCACHE 24, and when no other request for the same data line is pending. When the MISS_ARBITRATOR 107 returns the MISS_GRANTED signal 112 in response to the MISS_REQUEST 111, the MISS_GRANTED signal 112 is input to the SET input of the done latch 402, thus producing an active DONE signal to prevent any further MISS-REQUEST 111 being issued.

The MISS_GRANTED signal 112 also enables the driver 407 to pass the current content of the ~HIT 136a of the register 136 onto the CCC_MISS/HIT signal 408, which is sent to the system interface control 102. Based on the received CCC_MISS/HIT signal 408 and the STATUS 82, the system interface control 102 determines whether writing back, or flushing, of the data line (i.e., being pointed to by the MISS/COPY_IN ADDR 104) from the DCACHE 24 to the memory hierarchy (not shown) is required. In an embodiment of the present invention, whenever the data line is found in the DCACHE 24, i.e., the CCC_MISS/HIT 408 is inactive, and the STATUS 82 indicate that the cache line is dirty, the system interface control 102 causes the data line (i.e., being pointed to by the MISS/COPY_IN ADDR 104) to be written out to the processor that requested the cache line.

When the DPRESLOT 200 receives the indicated cache coherency check result on the TRANS_TYPE input 201 driven by the CCC SLOT 400, the DPRESLOT 200 initiates a pre-flushing operation in accordance with the principles of the present invention, which will now be described with references to FIGS. 2 and 5.

Figure 5:
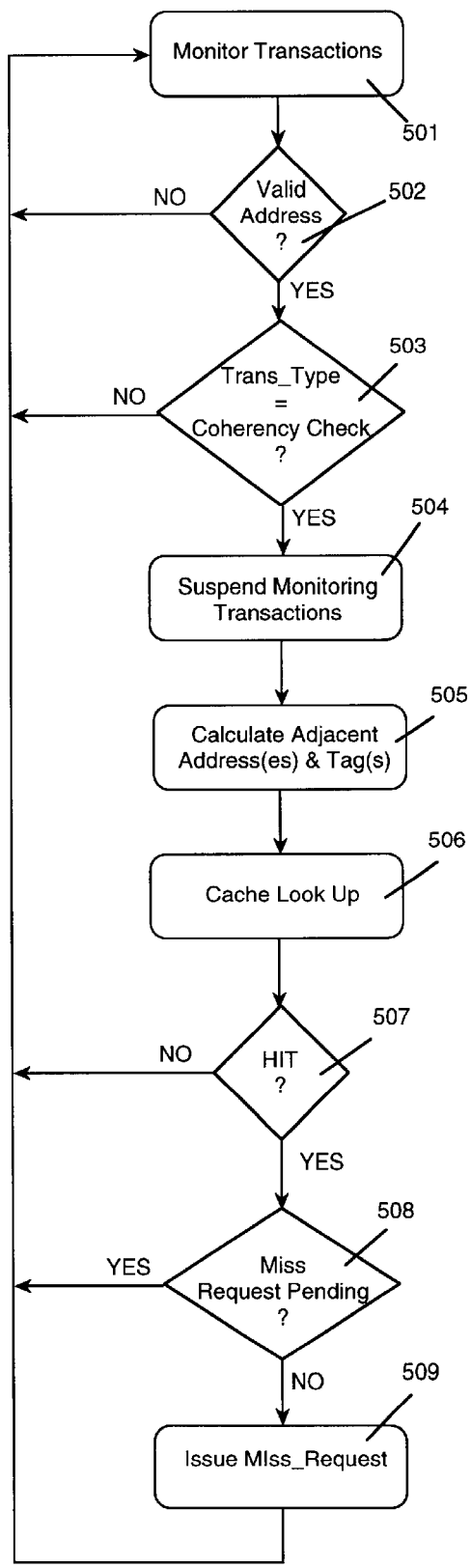
FIG. 5 is a flow diagram of an exemplary embodiment of the pre-flushing process in accordance with the principles of the present invention.

In particular, FIG. 5 shows a flow diagram of an exemplary embodiment of the pre-flushing process, in step 501 of which, the transactional interface between the instruction processing mechanism 39b and the system interface control 102 (which will be referred to as simply the "transactional interface" hereafter) is continuously monitored for a presence of any transaction, which may be accomplished by, for example, by monitoring for an assertion of the MISS_CAV 101 in the exemplary DPRESLOT 200 shown in FIG. 2.

Once a transaction is detected, a determination is made whether there is a valid address present in the transactional interface, e.g., by detecting the MISS_CAV signal 101 being asserted (step 502). When it is determined that a valid address is not present on the transactional interface, then the process returns to step 501, i.e., the monitoring of the transactional interface continues.

On the other hand, if a valid address is detected, the process proceeds to step 503, during which a determination is made whether the transaction is a coherency response resulting from a cache coherency check. When it is determined that the transaction is not a cache coherency response, then the process returns to step 501, i.e., the monitoring of the transactional interface continues.

However, if the transaction is a coherency response, e.g., a coherency response transaction requiring the copy of dirty data as indicated by STATUS 82, the monitoring of the transactional interface is halted, e.g., by setting the busy latch 203 to halt the updating of the register 136. Then, in step 505, one or more address(s) of data lines to be pre-flushed are calculated. The adjacent address logic 213 calculates the to-be-pre-flushed addresses by inverting one or more bits (e.g., the least significant bit (LSB)) of the address of the data line present on the MISS/COPY_IN ADDR 104.

In step 506, a cache look-up operation is performed for the addresses calculated during the above step 505. The DPRESLOT 200 issues an ACCESS_REQ 115 presenting the current contents of the CACHE INDEX 136b, the TAG 136c and the STORE 136d on the ACCESS_ADDR 114, the ACCESS_TAG 116 and the ACCESS_STORE 218, respectively, to the DCACHE 24.

In step 507, the result of the cache look-up operation is examined to determine whether the to-be-pre-flushed data line(s) is present in the cache memory, i.e., the DPRESLOT 200 determines that a cache hit has occurred by observing the ~HIT 118 being deasserted by the tag compare mechanism 108. If a cache miss has occurred, the process returns to step 501, and the monitoring of the transactional interface is resumed.

If, however, in step 507, a cache hit is detected, the process proceeds to step 508, in which a determination whether a request for the to-be-pre-flushed data line(s) is already made, e.g., by a ARBSLOT 48 shown in FIG. 1, by observing a HIT_DM 121. If it is determined that a request for the data line is already pending, then the process returns to step 501, and the monitoring of the transactional interface is resumed.

Finally, in step 509, if no prior requests for the data line is pending, flush transaction for the to-be-pre-flushed data line is issued, e.g., by issuing the MISS_REQUEST 111, which causes a memory hierarchy access by the system interface control 102 to write the data line(s) from DCACHE 24 to the memory hierarchy. To this end, the ~HIT input to the AND logic gate 137 may be inverted for the purpose of using the DPRESLOT 200 for a pre-flushing operation, e.g., when the TRANS_TYPE 201 indicates a cache coherency check. In a preferred embodiment of the present invention, the STATUS 82 is consulted, and the to-be-pre-flushed data line is flushed only if the status of the to-be-pre-flushed data line indicates that the data is dirty. In the alternative, the to-be-pre-flushed data line may be flushed without regard to its status. In a preferred embodiment, once the request for the to-be-pre-flushed data line(s) is issued, the process immediately returns to step 501, and the entire process is continuously repeated.

As can be appreciated, an efficient system for pre-fetching and/or pre-flushing one or more data lines, which does not affect the other components of, and thus can be easily integrated into, an out of order processing system, and which also minimizes redundant multiple memory requests, has been described.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. An apparatus for minimizing cache miss latency in an out of order instruction execution system, comprising:

a plurality of address reorder buffer slots each having stored therein an address corresponding to a data line of a plurality data lines, each of said plurality of data lines being stored in at least one of a cache memory and a memory hierarchy; at least one pre-fetch slot configured to, upon detection of a cache miss of a first data line resulting from an access request from at least one of said plurality of address reorder buffer slots, determine at least one additional data line to be pre-fetched into said cache memory from said memory hierarchy; and a logic associated with said at least one pre-fetch slot, said logic configured to provide an indication whether said at least one additional data line is already being requested from said memory hierarchy by any of said plurality of address reorder buffer slots, wherein if said at least one additional data line has not already been requested, the apparatus issues a pre-fetch request for said at least one additional data line from said memory hierarchy to said cache memory.

2. The apparatus for minimizing cache miss latency according to claim 1, wherein said at least one pre-fetch slot comprises:

an adjacent address logic configured to provide one or more additional addresses corresponding to said at least one additional data line, said at least one additional data line having a memory location adjacent to said first data line.

3. The apparatus for minimizing cache miss latency according to claim 2, wherein:

said adjacent address logic receives a first address corresponding to said first data line, and provides said one or more additional addresses by inverting one or more bits of said first address.

4. The apparatus for minimizing cache miss latency according to claim 3, wherein:

said one or more bits of said first address comprises a least significant bit of said first address.

5. The apparatus for minimizing cache miss latency according to claim 2, further comprising:

a busy latch having a set input and a clear input, said busy latch being configured to output a busy signal, and said busy signal being active when said set input is triggered, and inactive when said clear input is triggered, wherein said set input of the busy latch is triggered if said at least one additional data line has been requested from said memory hierarchy; and a register configure to store a cache index and a tag, both of which being derived from an address received from said adjacent address logic, said register receiving said address from said adjacent address logic upon receipt of an update signal, said update signal being produced by inverting said busy signal.

6. The apparatus for minimizing cache miss latency according to claim 5, further comprising:

a decode logic for receiving a cache miss address valid signal and a transaction type, said decode logic being configured to trigger said set input of said busy latch when said received cache miss address valid signal input indicates a transaction request is being made to said memory hierarchy and said transaction type input indicates that said transaction request is being made due to a cache access miss.

7. The apparatus for minimizing cache miss latency according to claim 6, wherein:

said logic is configured to trigger said clear input of said busy latch when said at least one additional data line is already being requested from said memory hierarchy by any of said plurality of address reorder buffer slots; and wherein said logic prevents said at least one pre-fetch slot from a memory access request for said at least one additional data line when said busy signal is inactive.

8. The apparatus for minimizing cache miss latency according to claim 5, wherein:

said register is configured to store a flag indicating whether said first data line is being read from or written to said memory hierarchy.

9. The apparatus for minimizing cache miss latency according to claim 8, further comprising:

a cache port arbiter configured to assert a cache grant signal that causes each of said cache index, said tag and said flag to be sent from said register to said cache memory.

10. The apparatus for minimizing cache miss latency according to claim 9, wherein:

said cache port arbiter receives a cache request signal, said cache request signal being output from an AND logic gate, which receives a clock pulse, said busy signal, a not one cycle after access signal and a not two cycles after access signal;

wherein said not one cycle after access signal is inactive during a clock cycle immediately following said access request; and wherein said not two cycle after access signal is inactive during a second clock cycle following said access request.

11. A method of minimizing cache miss latency in an out of order instruction execution system, comprising:

detecting an occurrence of a cache miss of a first data line;

calculating an address of at least one additional data line to be pre-fetched into a cache memory from a memory hierarchy;

determining whether a previously made request for said at least one additional data line from said memory hierarchy is pending; and if no previously made request for said at least one additional data line is pending, issuing a pre-fetch request for said at least one additional data line from said memory hierarchy to the cache memory.

12. The method of minimizing cache miss latency in accordance with claim 11, wherein said step of calculating said address of said at least one additional data line comprises:

inverting one or more bits of an address of said first data line.

13. The method of minimizing cache miss latency in accordance with claim 12, wherein:

said one or more bits comprises a least significant bit.

14. The method of minimizing cache miss latency in accordance with claim 11, further comprising:

if said previously made request is pending, preventing a memory request for said at least one additional data line from being newly made.

15. The method of minimizing cache miss latency in accordance with claim 14, further comprising:

determining whether said at least one additional data line is present in said cache memory.

16. The method of minimizing cache miss latency in accordance with claim 15, further comprising:

if said at least one additional data line is present in said cache memory, preventing a memory request for said at least one additional data line from being newly made.

17. The method of minimizing cache miss latency in accordance with claim 15, further comprising:

if said at least one additional data line is not present in said cache memory, issuing a request for said at least one additional data line from said memory hierarchy.

* * * * *